Aug. 13, 1940.  B. KARLOVITZ ET AL  2,210,918
PROCESS FOR THE CONVERSION OF ENERGY AND
APPARATUS FOR CARRYING OUT THE PROCESS
Filed Aug. 12, 1936  2 Sheets-Sheet 1
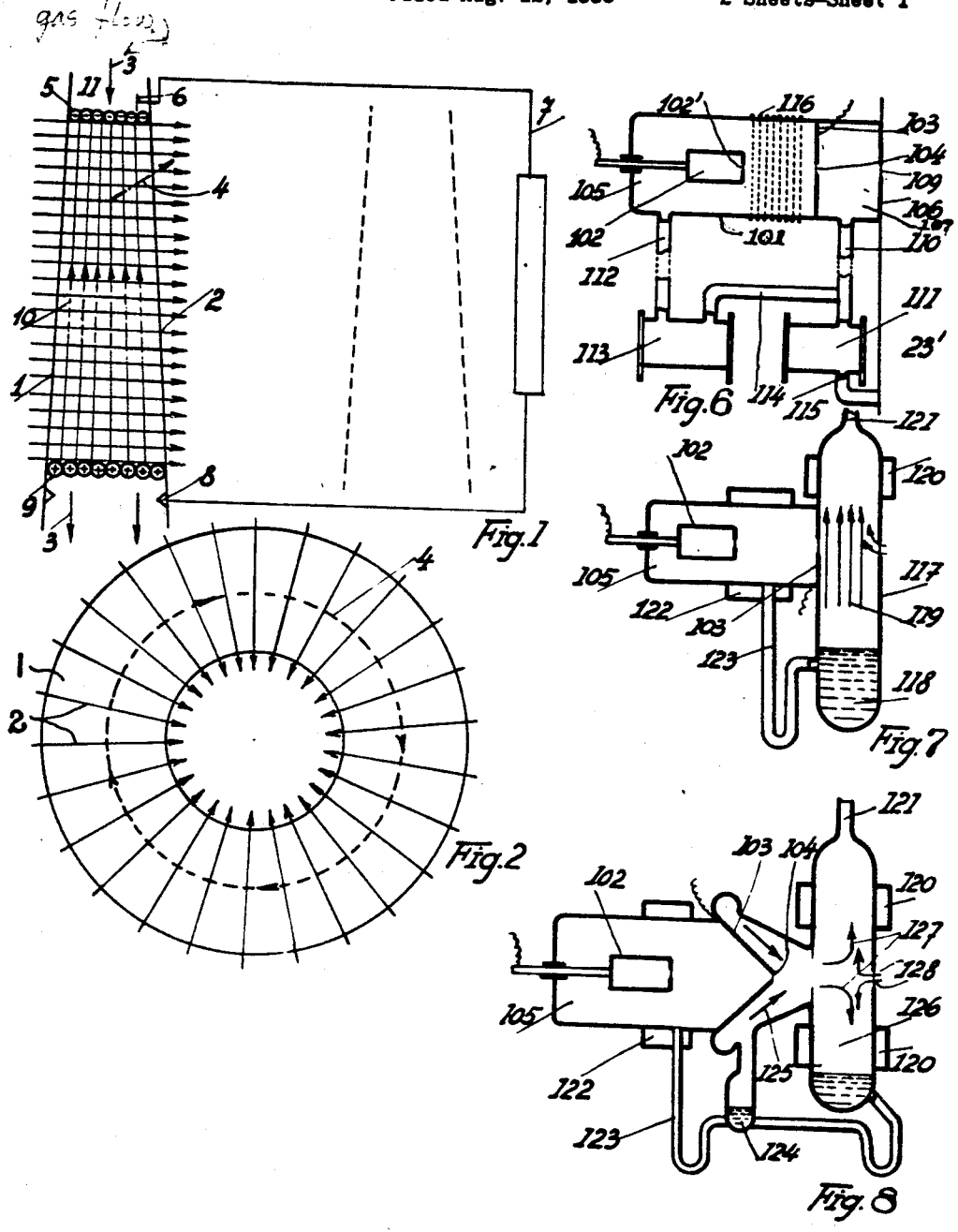
INVENTORS
BELA KARLOVITZ
DENES HALASZ
per
Albert F. Nathan
Attorney

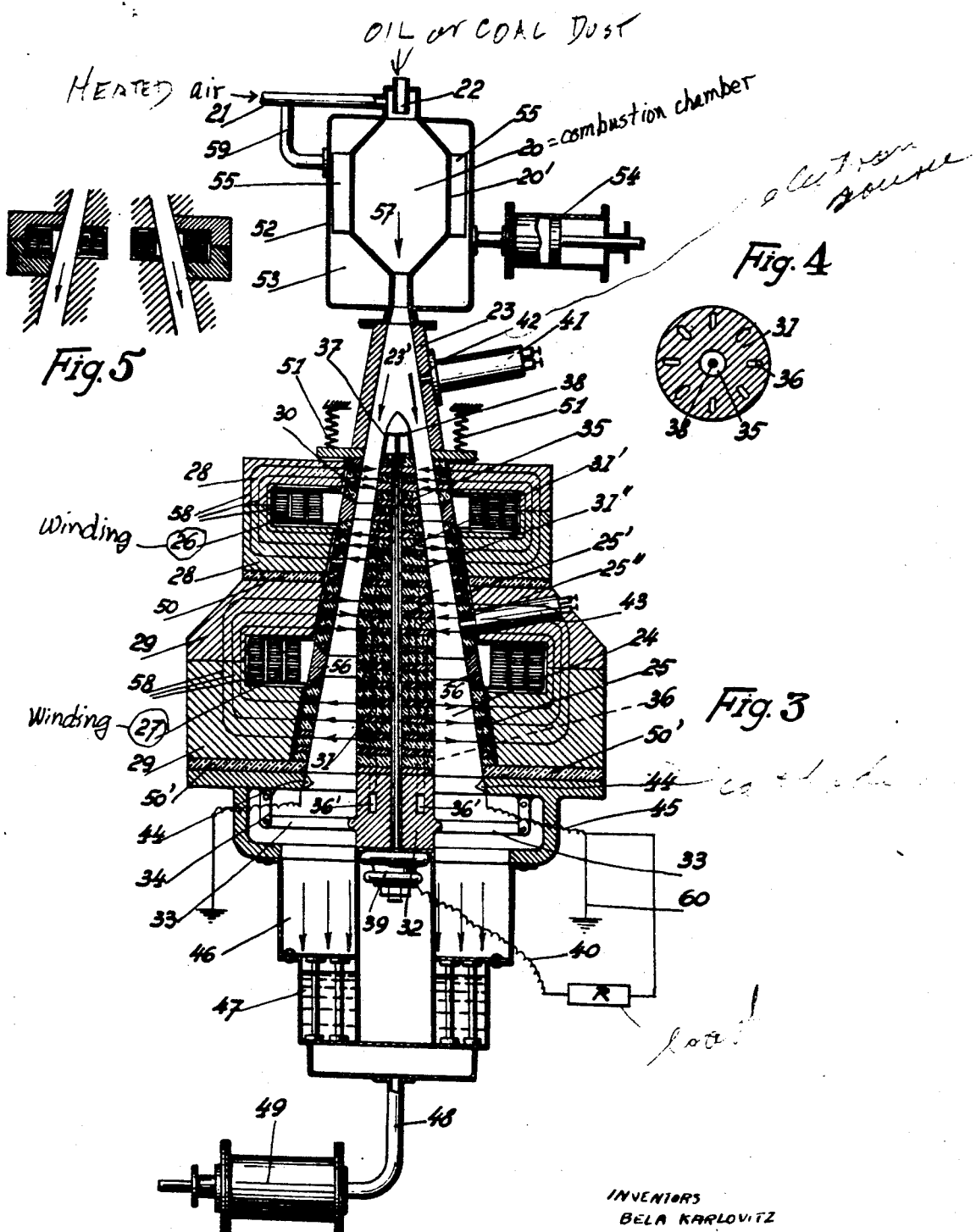

Patented Aug. 13, 1940

2,210,918

UNITED STATES PATENT OFFICE 2,210,918

PROCESS FOR THE CONVERSION OF ENERGY AND APPARATUS FOR CARRYING OUT THE PROCESS

Béla Karlovitz and Dénes Halász, Budapest, Hungary

Application August 12, 1936, Serial No. 95,562
In Hungary August 31, 1935

42 Claims. (Cl. 171—212)

The invention relates to a process for the conversion of energy and apparatus for carrying out the process.

According to the present invention, the conversion of energy is effected by passing a current of a gaseous working medium containing particles having positive ions and free electrons through a magnetic field which lies transverse to the direction of flow of said current and the process is characterised in that electrons are drawn out of the current of working medium for the purpose of useful output without passing through the magnetic field which assists in the excitation of the useful voltage and are led back again through an external circuit to the current of working medium at a point displaced in the direction of flow of such medium, whilst electrons which are not taken off for useful output are maintained in the magnetic field and are caused to move in a direction transverse to the current of working medium in order to maintain their state of equilibrium.

Electrical energy can be obtained by means of the process according to the invention if the electrons drawn off from the working medium are fed back through an external circuit from the point at a lower positive potential in the working medium to a point at a higher positive potential.

On the other hand, if the electrons drawn off from the working medium are fed, with the aid of an external source of electrical energy, from a point in the working medium at a higher positive potential to a point at a lower potential, the energy of the flowing working medium can be increased.

All substances which can be used as carriers of positively charged ions and free electrons are applicable as gaseous working media. Thus, for example, gases such as air, nitrogen, inert gases, as also vapours, for example mercury vapour, as well as particles of a colloidal and suspensorial order of magnitude containing gases, such as, for example, dust-clouds, fog-clouds, and so on, can be used.

Referring to the accompanying drawings:

Figure 1 is a diagrammatic representation of the action in a longitudinal section of a working passage of a generator according to our invention, Fig. 2 is a similar representation of a cross-section through a working passage according to our invention, Fig. 3 is a sectional elevation through a generator according to our invention, Fig. 4 is a cross-section through the central core of the generator shown in Fig. 3, Fig. 5 is a fragmentary elevation showing a modified magnetic construction, Fig. 6 is a diagrammatic illustration of one form of electron ray generator for exciting the generator of Fig. 3, Fig. 7 is a similar illustration of a modified electron ray generator, and Fig. 8 is a similar illustration of a further modification of the electron ray generator.

The process according to the invention is diagrammatically set out in the appended Figs. 1 and 2.

A gaseous working medium flows in the direction of the arrows 3 through a passage 1 which may be regarded as the left side of the longitudinal section of the annular passage shown in Fig. 2 or Fig. 3 hereinafter referred to, and which is permeated by the radial magnetic lines of force indicated by the arrows 2. This passage is to be conceived as being the working passage of a generator. Care must be taken to see that the working medium contains positively charged ions and free electrons in the space 11 lying in front of the point of entrance to the working passage. This is done, for example, by introducing electron rays into the space 11. Owing to the ionisation with electron rays, positively charged ions and free electrons in large numbers are produced in the working medium, which hitherto has been neutral. The number of ions formed is equal to that of the electrons, so that consequently the quantities of positive and negative electric charge will also be equal to one another. The mobility of the positive ions is slight, and by reason of the effect of an electric force and on account of the large amount of friction they set up in the working medium they move comparatively slowly. The free electrons, on the other hand, have a comparatively great, some thousands of times greater, mobility than the positive ions, so that owing to the same effect of electric force the velocity of the free electrons is some thousands of times greater.

Owing to the large amount of friction set up, the working medium flowing in the magnetic field carries along the positive ions, whereas the free electrons, when moving in the magnetic field are deflected by the latter, the direction of this deflecting force being perpendicular to the magnetic lines of force as well as to the direction of movement of the electrons. This force thus deflects the electrons away from their original direction and in a path transverse to said original direction, but does not affect their velocity. Owing to the effect of this magnetic force, the electrons deviate from the direction of flow of the working medium and, since they move at a high velocity in a perpendicular direction to the direction of flow of the working medium. Due to the magnetic field and the movement taking place therein, there acts on the electrons a force which is in a direction opposed to the force exerted on them by the electric field which is indicated by the arrows 10 and which balances such latter force.

The electric field is set up owing to the fact that the positive ions are drawn through the generator by the current of gas, whereas the electrons are compelled to move in a transverse direction by the magnetic field, so that they are, so to speak, held fast at a certain level or section longitudinally of the passage and cannot force their way through the generator. That part of the generator within which the magnetic field is set up accordingly constitutes a semipermeable wall, since it allows the neutral particles and the positive ions to pass through, whilst the electrons are held up in it. The working medium flowing to the generator carries along large quantities of ions and electrons. The electrons will be unable to get through the magnetic field of the generator if electrons are already circulating therein, but will, on the contrary, collect at the beginning of the generator at the boundary of the magnetic field and will there form the electron cloud 5. The positive ions will pass with the current of gas through the magnetic field and will issue in common with the current of neutral particles from the other end of the generator. The negative cloud-charge stored in front of the magnetic field of the generator, and the positive cloud-charge stored behind the magnetic field constitute to a certain extent the two coatings of a condenser, between which an electric field is set up counter to the current of gas. By the term positive cloud-charge is to be understood not a stationary quantity of positive ions, but a volume in which free positive ions are present in excessive quantities independently of whether the positive ions constituting the charge are flowing or are at a standstill. The electric field exerts on the positive ions an attractive force in a direction opposite to that of the current of gas. A large amount of friction is set up between the positive ions and the neutral particles of the working medium, so that the positive ions are unable freely to obey the attractive force of the electric field, but transmit this mechanically to the entire neutral working medium. In this way, the electric field of the generator exerts a retarding effect on the whole quantity of the flowing working medium.

Owing to this attractive force, use is made of the kinetic energy of the working medium for the purpose of producing electrical energy, since, counter to the effect of the electric field, positive electric charges are brought from a point at a lower positive potential to a point at a higher positive potential. If two points at different potentials in the electric field are joined together electrically, a current will flow from the point at a higher potential to the point at a lower potential, or, which means the same thing, electrons will pass from the point at a lower positive potential to a point at a higher positive potential.

Energy is available not only in the velocity of flow of the working medium, i. e., in the directed movement of the elementary particles, but also in the forms of pressure energy and heat energy, which can also be converted into kinetic energy. If, therefore, the electron cloud 5 stowed in front of the magnetic field be brought out of the working channel to the terminal 6 and thence through the external circuit 7 to the terminal 8, and from there the negative electrons for neutralizing the positive ions 9 be brought back again into the working medium, electrical energy will flow in the external circuit 7.

The closed electric circuit is produced owing to the fact that the quantities of positive and negative charge at the end of the magnetic field, after passing along separate paths unite again at the positive pole of the generator. Accordingly, in one branch there will be a flow of positive ions and in the other branch a flow of electrons, so that the two currents connected in parallel will be equivalent to a closed electric circuit.

Because of the limitation of materials used to provide the magnetic field, it is desirable to provide the field in sections as shown more fully in the specific embodiment of the machine in Fig. 3. The voltages generated by carrying the positive ions through each section preferably being connected in series in a manner analogous to a multipolar rotating machine in which the coils pass under a plurality of pairs of poles to induce the desired high potential which is collected by a single pair of brushes at the terminals of the coils. The terminal potential of applicants' generator depends upon the total field through which the positive ions are carried. The electron cloud is formed at the front of the magnetic field and returned over the load circuit and returned to the positive ion cloud at the rear of the magnetic field. In order to secure the greatest possible electrical energy, the magnetic field is preferably sufficiently great to require the expenditure of the greatest quantity of available energy to pass the positive ions through the field. The potential of several sections of the magnetic field are connected in series without the necessity of metallic connectors as the ions flow continuously in an even stream through the sections. Obviously, energy of various potentials could be secured by providing suitable terminal electrodes for collecting or returning electrons at any place in the ion stream in a manner analogous to taps in the coil of a rotating generator.

If the energy per unit of weight available of the flowing working medium and the desired voltage at the terminals of the generator be given, the necessary quantity of charge per unit of weight can be calculated from the equilibrium of the work available and of the electric work done.

The relationship between the voltage at the terminals and the specific quantity of charge is as follows:

$$Eq = \frac{w_a^2}{2g} - \frac{(w_e^2)}{2g}$$

where E is the pressure between the terminals of the generator in volts, $q$ the electric charge per kilo of working medium, $w_a$ the initial velocity of flow of the working medium, $w_e$ that at the end of the working passage of the generator, and $g$ the acceleration due to force of gravity.

The theoretical value of the current in an apparatus working on the lines of the equation above set out will be $$J \text{ amperes} = qG$$

G being the weight in kgs. of the quantity of working medium flowing per second.

In order where possible not to hinder the movement of the electrons which have been deflected from their original position and are stored up at a certain level or section along the working passage in the magnetic field, care should be taken to see that these electrons are allowed to circulate in a closed path. This can be done, for example, by giving the passage which is traversed by magnetic lines of force an annular cross section. In Figs. 1 and 2, 1 is the wall of the working passage and the arrows 10 indicate the direction of the electric field. As will be seen from these figures, the magnetic field which is radial and, which cuts the direction of flow of the working medium at right angles, causes the electrons to circulate in the direction indicated by the arrow 4. This arrow in Fig. 1 is to be regarded as perpendicular to the plane of the paper.

By reversing the aforedescribed process and by the expenditure of electrical energy, the energy of the working medium can be increased. This is done by allowing the working medium to flow in the same direction as the electric lines of force, the flowing working medium absorbing, under the agency of the positive ions, work from the electric field. In this case, the electrons withdrawn from the working medium must be returned to the working medium with the aid of an external source of electrical energy. An electric field agreeing in the direction of flow of the gaseous medium and in the same sense, can be set up by applying an external electric voltage to the poles. This external voltage must, of course, be greater, circumstances being equal, than that which the apparatus as a source of current would furnish.

The charge cloud formed in a sense contrary to that which would be formed if no external voltage were applied to the generator is due to the fact that the electrons enter the pole, not owing to congestion, but are drawn out of the gas by the voltage applied to the system, and so rapidly, indeed, that an excessive positive charge is present in front of the generator, and it is in this manner that the positive charge is formed in front of the magnetic field. At the rear end of the magnetic field and owing to the effect of the external voltage the electrons issue from the pole and enter the gas so rapidly that the positive ions issuing from the magnetic field are neutralised and, moreover, appear at the end of the magnetic field in the form of a negative charge. It is in this way that a negative charge cloud is formed at the end of the magnetic field. The reversal of the method of operation of the apparatus, i. e., the conversion of electric energy into mechanical motion is possible in the manner described.

In the process described, the positive ions move in a direction of flow in common with the working medium, against the effect of the electric field, and perform the external electrical work. The electrons stowed in front of the generator return through an external circuit to the positive ions. In the working passage the electrons move in a direction perpendicular to that of the flow of gas and play only an energy-transmitting part.

The electrons which furnish work in an electric field running transversely to the direction of flow of the working medium enter the working chamber at a point on the generator, flow through said chamber obliquely to the direction of flow of the gas and issue again from the generator, so that they do not constitute any constant constituents of the generator.

The electrical output can be divided at choice between the positive ions flowing in a longitudinal direction and the electrons flowing in a transverse direction.

The conversion of energy having a high efficiency and a favourable voltage at the terminals stipulates a great density of charge. In this case, however, the positive ions and electrons present everywhere in the working medium in equal quantities and in large numbers can easily come together again and thus diminish ionisation.

This loss, due to recombination, of positive ions and free electrons is not great, so that under the conditions applicable to the process it does not mean a loss worth mentioning. The free electrons, however, can adhere to single elementary particles of matter, whereby in this way negative ions are formed. A union of the negative ions and of the positive ions is more probable, so that consequently—particularly in the case of great charges of great density—the negative ions will recombine very rapidly with the positive ions. The nascent state of negative ions depends mostly upon the nature of the neutral elementary particles of the working medium. Thus, for example, inert gases, metallic vapours, as also nitrogen are only very little inclined to bind free electrons. On the other hand, the so-called electro-negative gases, such as, for example, chlorine, water vapour, oxygen, carbon dioxide, absorb electrons very easily, so that large quantities of negative ions can be formed in these gases. In addition to the neutral particles of the working medium, only positive ions and free electrons are requisite for the conversion of energy; the negative ions do not take part in the efficiency, but merely neutralize an equal number of positive ions. The negative ions can consequently set up large losses of energy. Supposing, for example, that no negative ions were to be formed at all; in that case the power required for purposes of ionisation by a generator having an output of 30,000 kilowatts would amount to something like 250 kilowatts. The employment of electro-negative gases as a working medium can under certain conditions, such as low temperature and high pressure, produce such a large quantity of negative ions capable of recombining that not even the useful output of a 30,000 kilowatt generator would suffice to obtain the necessary ionisation.

The harmful influence of the negative ions will therefore be suppressed if a working medium be selected which has no tendency to form negative ions. Working media of this sort, however, can only be set in motion by the addition of external energy, such as for example heat energy. For practical reasons it is of the utmost importance to design the generator in the form of an internal combustion engine, the combustion gases being applicable as a working medium for the generator. But the combustion gases contain a number of electron-absorbing constituents, such as for example carbon dioxide and water vapour. The electrons combine with the said particles of gas at only a very slight energy to form ions. This combination can be broken up by using a high temperature and a low pressure, the resultant negative ions being dissociated into free electrons and neutral molecules of gas, before even a recombination of the positive and negative ions would take place. Thus, for example, electro-negative constituents containing combustion gases at a temperature of about 600 to 800 degrees centigrade and a pressure of from 0.02 to 0.05 of an atmosphere can also be used with good effect for the process claimed in the present invention. The pressure of the combustion gases should preferably be maintained at 0.1 and 0.01 of an atmosphere and the temperature at between 500 to 1000 degrees centigrade.

The electro-negative constituents in the combustion gases can be diminished by using fuels which during combustion give off little or no water vapour. Such fuels are, for example, coke, charcoal, semi-coke. For purposes of diminishing the water vapour content of the combustion gases, the fuel in question can be submitted to a preliminary drying process and to dry distillation, whereby the moistue contained therein, the hydrate water and the water vapour content present, are for the most part driven off. The water vapour content of the air used for combustion can likewise be diminished, for example, by drying, concentrating by freezing, and so on.

The method of operation of the generator described with the aid of Figs. 1 and 2 constitutes an ideal limiting case, which in actual practice can only be attained more or less approximately. It has, for example, been laid down that the electrons and the positive ions do not re-combine in the generator, but this can as already pointed out, only be attained imperfectly and, if the values of the positive and negative quantities of charge are to be equally maintained in the generator, the amplification of the ions and electrons must be seen to. Consequently, apart from the ionisation of the working medium before it enters the generator, a further ionisation must take place in the working chamber.

Prior to its entering the generator, the working medium can be ionized in two kinds of ways, i. e., either by introducing electron rays, or else by passing the working medium through a highly tensioned electric field. Then, owing to the collision between the accelerated electrons and ions present in the working medium, more free electrons and positive ions will be generated.

Therefore, care would have to be taken to see that the positive ions and the free electrons which disappear owing to re-combination are replaced and uniformly distributed in the working chamber of the generator. As a matter of fact, however, there is no need to do this, since with the aid of the electron rays the ions and electrons generated concentrated in the flowing gas set up eddies, owing to the unequal electric braking effect, by means of which the additional ions and electrons are equally distributed.

The electron rays which bring about this additional ionisation have under conditions which can be fulfilled in actual practice a free path of a few metres. In a transverse direction through the generator, paths of only a few decimetres are available for the electron rays. In order to be able to utilize the whole of the energy of the electron rays for purposes of ionisation, without the electrons striking against the wall of the generator, which would mean that they would be lost for purposes of ionisation, the electron rays are introduced at an angle into the generator. The electron rays wind themselves around the magnetic lines of force, so that the electrons expend their full energy along an extended path, before they strike against the walls of the generator.

With the foregoing consideration in view, an apparatus has been designed on the basis of Figs. 1 and 2 and this apparatus is shown by way of example in Figs. 3 to 5.

The air pipe 21 and the pipe 22 convey the fuel discharge into the combustion chamber 20. In communication with the combustion chamber 20 is also a passage 23 shaped somewhat like a Laval expansion nozzle and extending into the similarly expanded working passage 24. The outer wall 25 of the working passage 24 consists of ion rings 25" separated from each other by insulations 25'. Placed in the neutral zone of the magnets are rings 56 made of non-magnetic metal. The working passage is surrounded by windings 26 and 27 for exciting the magnetic flux and are enclosed in iron jackets 28 and 29. The windings which excite the magnetic flux are separated, as are also their iron jackets, from the wall 25 of the working passage by means of an insulating air-gap 30 which is traversed by a current of air for cooling the working passage 25. Inside the working passage is a core 31 consisting of discs 31" made of magnetisable metal and separated from each other by the insulating layers 31'. The core 31 is mounted so as to be capable of movement due to expansion by heat, on a holder supported by a bracket 32 and consisting of the arm 33 and 34. The core 31 is intersected by a central as well as by a number of passages 35 or 36 formed near the surface which are in communication with each other through a hollow metal cap 37 mounted at the upper end of the core. The metal cap 37 is connected through the conductor 38 with the insulator 39. The conductor 38 is connected through the connecting lead 40 with the external circuit.

Joined on to the part 23 of the pipe is the device 41, for exciting the electron rays, which communicates with the inner space 23' of the pipe 23 through the opening 42. A number of devices for introducing additional electrons also communicate with the working passage. One such device is shown at 43. Incandescent cathodes 44 which admit electrons and are joined on to the connecting lead 45 are provided at the end of the working passage.

Fixed to the working chamber of the generator is the air-cooler 46 and the radiator (water-cooler) 47 which communicate through the pipe 48 with a compressor 49. The jackets 28 and 29 carrying the magnetic flux are each divided into two parts and are separated from each other and from the frame of the engine by means of insulations 50 and 50', respectively. The individual parts of the jackets can also be insulated. The wall 25—made up of separate, annular parts—of the working passage is loaded by springs 51 and held firmly in position. The wall 20' of the combustion chamber 20 is enclosed in a jacket 52 leaving an intermediate space 53, the latter being in communication with the air compressor 54. For purposes of cooling the combustion chamber, the compressor furnishes air to the space 53, the air then passing thence through the pipe 59 into the pipe 21. Cooling gills 55 are mounted on the outer side of the wall 20' of the combustion chamber. The outlet ends 36' of the cooling passages 36 are in communication with the compressor 54 in a manner not shown in the drawings.

The apparatus works as follows. Oil or coaldust is blown into the combustion chamber 20 through the fuel supply pipe 22, said fuel being burnt with the preheated air entering through the pipe 21. The products of combustion pass, at a high temperature and at a high pressure and in the direction of the arrow, into the Laval nozzle— which in its cross section first tapers and then expands—where at a reduced pressure and at a lower temperature they expand adiabatically, so that a large portion of the heat energy of the gas is present at the beginning of the magnetic field in the form of rectified kinetic energy. When the generator is actuated, the electromagnets 26 and 27 will be excited, the magnetic flux 58 permeating the core 31 and the working chamber 24 of the generator and passing back into the electromagnets. Electrons issue at a high velocity through the opening 42 in the device 41—which produces said electrons into the space 23', and these electrons collide with the flowing molecules of combustion and generate large quantities of positive ions and electrons. Owing to the effect of the magnetic field a cloud of electrons stowed in the current of gas entering the generator space 24 of the working passage will be formed in the space lying around the cap 37. The current of gas issuing from the generator space will form a cloud of positive ions of the same height as the cathodes 44. When the negative pole 37 is joined to the terminal 44 through the circuit 39, 40, 45 and the useful resistance R, the electrons will stream out of the space lying around the terminal 37, back to the incandescent cathode 44 and into the working medium for the purpose of neutralising the positive ions. The electric energy generated in this way in the external circuit can be called upon to furnish work.

In the combustion chamber described, a temperature of preferably 1500 to 2000 degrees centigrade and a pressure of 6 to 15 atmospheres will answer, in which case, at the end of the Laval expansion nozzle 23 the velocity of the gases can amount to 2000 to 2200 metres per second, the temperature to from 600 to 700 degrees centigrade, and the pressure to 0.02 to 0.05 of an atmosphere.

The conductor 38 connected with the negative pole 37 can be used not only for the purpose of carrying off the electrons but also for holding together the individual constituent parts of the core 31 which is made up of annular parts. The conductor 38 connected with the cap 37 can also be used for holding together the discs 31' and 31" mounted between the cap and the insulating holder.

A pressure similar to that in the combustion chamber 20 should preferably be maintained in the space 53, so that in this way the walls 20' of the combustion chamber which are subjected to a high temperature can be relieved of the mechanical stresses set up by the internal pressure.

In the form of construction shown by way of example two contrivances are employed which are not directly coupled together and which excite closed magnetic fluxes. The iron jackets 28 and 29 enclosing the windings 26 and 27 by which the magnetic fluxes are generated are each composed of two parts, the cross sections of which are of unequal size, so that they bear against the wall of the working passages with the pole surfaces differing in size. The strengths of the magnetic fields permeating the working passage will thus vary according to the different sizes of the pole surfaces. Owing to this gradation of the strength of the magnetic field, the magnetic field can be adapted, with a view to obtaining a high efficiency, to a cross section of passage favourable to the flow. A reference to the form of construction given by way of example will show that the working passage is at its outset—where the velocity of the current of gas is a maximum—permeated by the stronger field, whilst a weaker field of magnetic strength prevails at that part of the working passage through which a current of gas is flowing at less velocity.

The electric fields excited in the different magnetic sections are of different intensity as are also the voltages set up by the different sections, by reason of which it becomes possible to give the channel a shape favourably adapted technically to the passage of a flow.

The neutralized products of combustion issuing from the working chamber pass into the air cooler 46, thence into the radiator 47, from there into the compressor 49, whence they escape into the open air. The current of cold air coming into the air coolers can be pre-heated by the cooling chamber of the generator or by the cooling chamber of the combustion space and compressed, for example, through the pipe 59 into the combustion chamber.

In the described apparatus the fuel is practically completely consumed in the combustion chamber 20, and the resultant heat energy and pressure energy are converted in the pipe 23 into energy of flow. In certain cases it will be found advantageous to carry out the combustion isothermically, that is to say, to convert, during combustion, the heat energy directly into energy of velocity. This can be done by so designing the combustion chamber or that part of it which faces the Laval expansion nozzle that the space content of the pipe between any two cross sections of it will suffice to produce such a great heat of combustion as amounts to the difference in the kinetic energy of the working medium between the two cross sections. This can be achieved in a practical way by lengthening that part of the Laval expansion nozzle lying between its smallest cross section and the combustion chamber. The energy content of the products of combustion will in this way be transformed by isothermic combustion followed by adiabatic expansion into kinetic energy of the elementary particles of gas.

The output of the generator can be regulated by adjusting the fuel supply, and the air necessary to combustion can also be regulated, so that the composition and consequently also the specific heat content of the gas will not vary. Since the quantity of gas flowing through the Laval expansion nozzle per unit of time at equal temperature is practically really only a function of the pressure prevailing in front of the pipe, the heat energy introduced into the generator can be regulated by varying the pressure in the combustion chamber. Thus, when the output varies, the temperature and the velocity of the gas in the generator will not vary; the pressure in the combustion chamber can be increased by increasing the number of revolutions of the air compressor 54. The number of revolutions of the vacuum compressor 49 will be reduced when the working pressure is greater, i. e., when the output is increased, since in this case a smaller difference of pressure is produced, in order to be able to compress the gas to atmospheric pressure.

The regulation of the voltage at the terminals to a constant value can be effected by proportionally varying the current with the output, i. e., by a proportional adjustment of the output of the ionising electron rays, since the velocity of the gas in the engine will not vary when the load varies.

For purposes of automatically regulating the ionization, recourse can be had to the velocity of the gases issuing from the end of the generator (at the height of the cathode 44), or to the variation in these gases and other processes connected therewith, such as for example, variation in pressure, variation in the electric field, and for purposes of automatically regulating the fuel supply use can be made of the voltage at the terminals. By thus automatically regulating these values, the output of the engine will adapt itself automatically to all demands when the voltage at the terminals does not vary. When the load is diminished the strength of the magnetic field can be diminished in the same sense as the load, so as to ensure a slighter drop in efficiency.

The caloric cycle of the described apparatus accords entirely with the thermo-dynamic cycle, in which mechanical energy is derived from heat. A characteristic of this energy-transforming apparatus is that whilst in the case of engines and machinery at present in general use, such as, for example, steam turbines, motors, the energy has been transformed with the aid of moving machine parts, the conversion of energy directed into electric energy is effected on the lines of the present invention without the intermediary of moving parts of machinery.

The lower part of the generator, or the lead connected with the positive pole can be earthed by means of the conductor 60. If it is desired to join two or more generators together in series, this earthing is omitted, and the metallic component parts of the generator working chamber are insulated from the cooler 46 and the holder parts. In this case the positive pole of the generator is brought on to the negative pole of the next following generator.

By way of example, suppose a generator which in the manner described runs on gases of combustion derived from a combustion chamber burning coaldust or oil and is dimensioned for an output of 33,000 kilowatts.

The characteristic data of this generator are as follows. A pressure of 13.6 atmospheres prevails in the combustion chamber 20, the temperature amounts to 2000 degrees centigrade. The products of combustion contains 10% water vapour.

The gases of combustion on entering the magnetic field, the point of entry having a cross section of 0.565 of a square metre, have a temperature of 600 degrees centigrade and a pressure of 0.043 of an atmosphere. The velocity of flow at this point is 2195 metres per second. At the point of entry the strength of the magnetic field is equivalent to $$1.065.10^{-4} \frac{\text{volts sec.}}{\text{cm}^2}$$

and the strength of the electric field to 34.6 volts per centimetre.

The specific efficiency of the working chamber is 31.6 kilowatts per cube decimetre.

The efficiency of transformation of mechanical work into electric energy is 85.2%.

For generating the necessary ionisation by means of electron rays an expenditure of 250 kilowatts will be required.

At the point of outlet 44 from the magnetic field of the generator, the following data arise:

Temperature 700 degrees centigrade
Pressure 0.0234 of an atmosphere
Velocity 350 metres per second.

The cross section of the outlet being 7.25 square metres.

The strength of the electric field is 6.2 volts per centimetre.

The strength of the magnetic field is $$0.379.10^{-4} \frac{\text{volts sec.}}{\text{cm}^2}$$

The efficiency amounts to 89.1%.

In the transformation of the caloric energy of the fuel into electric energy the total efficiency is 52.5%.

It is assumed that in the apparatus just described the working medium consisted of gases of combustion. The generator can however be run in another way, that is to say, by substituting an externally heated boiler for the combustion chamber 20. In this case steam is raised, which is introduced into the pipe 23 and is utilized for purposes of generating electric energy. The steam issuing from the working passage is condensed in coolers and continually fed to the boiler with a view to furnishing more work. In this process, compressors are not needed.

In the case of external combustion the working medium can consist not only of matter convertible into the form of steam, but can also consist of permanent gases, such as for example inert gases. In this case compressors will be required.

The working medium can also consist of gases which contain solid particles of matter of a colloidal or suspensorial order of magnitude, said particles, when heated to a high temperature, emitting electrons, and containing a positive charge. In this case an external ionization of the current of gas would perhaps be superfluous, so that the described device 41 for generating the electron rays can also be dispensed with.

In place of a thermal emission of electrons (cathodes 44), other known contrivances for emitting electron rays can also be employed.

The generator just described can also be so designed as to bring the windings which excite the magnetic field not only outside the working passage, but inside as well. This arrangement is shown diagrammatically in Fig. 5.

One form of construction given by way of example of a device for generating electron rays is shown in Figs. 6, 7 and 8. Mounted in the valve 101 is a cathode 102 which is mounted opposite the anode or plate 103. The wall of the plate is perforated by an aperture 104. Annexed to the valve 101 is a chamber 106 whose inner space 107 communicates through the aperture 104 with the space 105 in the valve 101. The chamber 106 is in communication through the opening 109 with the space 23' in the Laval expansion nozzle. The chamber 106 communicates through the pipe 110 with the air pump 111, whilst the pipe 110 is in communication through the pipe 112 with the air pump 113. The two air pumps are connected together in series by the pipe 114. The valve 101 is surrounded by a magnet winding 116 which is used for rectifying or concentrating the electron rays. The incandescent cathode 102, as well as the plate 103 are connected with a high tension continuous current. A bundle of electron rays issues at high velocity from the incandescent cathode through the aperture 104 and impinges on the plate. This bundle of electron rays is concentrated in the aperture 104 by means of the electro-magnets 116. The electrons emitted by the cathode thus flow in a straight beam through the aperture 104, pass through the opening 109 which lies in a straight line with the said apertures, and enter the inner space 23'—through which the working medium flows—of the generator. The working medium entering the spaces 107, or 105, is suctioned by the vacuum pumps 111 and 112 and fed back again, through the pipe 115, into the working passage of the generator. Owing to the employment of the antechambers it becomes possible to obtain, in the valve 101, a sufficient high vacuum for the generation of electron rays.

The valves of the pumps 111 and 113 are not shown. The pump 113 suctions through the pipe 112 and forces the suctional gas through the pipe 114 into the pump 111 which is thus connected in series with the first one. The pump 111 suctions through the pipe 110, as well as through the pipe 114, and forces the gases through the pipe 115. The use of two pumps in series facilitates the more complete exhaustion of the tube.

Figs. 7 and 8 differ from the device shown in Fig. 6 essentially only in so far as diffusing pumps are used in the place of air pumps. The antechamber 106, shown in Fig. 6, corresponds to the antechamber 117 shown in Fig. 7, which is designed as a constituent part of the diffusing vacuum pump. The vapour-forming liquid 118 is collected in the lower part of the chamber 117 and, when boiling, generates a current of vapour flowing in the direction of the arrow 119. At the upper end of the chamber 117 is a cooler 120. The pipe 121 leads to the vacuum pump which conveniently in the aforedescribed manner feeds back again into the working passage of the generator the non-condensing particles of the working medium coming from the working chamber of the generator and dragged along by the current of vapour. The vapour arriving inside the electron valve is liquefied by the cooler 122. The liquefied matter flows through the pipe 123 into the lower part of the chamber 117.

In the device shown in Fig. 8 the vapour coming off the diffusing pump is generated in the boiling space 124. This vapour flows, in the direction of the arrow 125, into the antechamber 126 and works there, in the direction of the arrow 127, counter to the incoming working medium. The direction in which the incoming working medium flows is indicated by the arrows 128. In this arrangement, the plate 103 is cone-shaped.

The diffusing vacuum pump can be actuated with, for example, mercury vapour, oil vapour.

The device generating the electron rays may also be provided with a number of antechambers connected together in series. In this case a higher vacuum will be obtainable.

What we claim is:

1. A process for the conversion of energy, which consists in producing a current of gaseous working medium, ionizing said working medium to provide particles having a positive charge and free electrons, producing a magnetic field which lies transverse to the direction of flow of said current of working medium, causing said gaseous current to flow through said magnetic field, drawing out electrons from said current of working medium for the purpose of useful output without passing through the magnetic field which assists in the generation of the useful voltage, returning said drawn out electrons through an external circuit to the current of working medium at a point displaced in the direction of flow of such medium said magnetic field causing electrons which are not taken off for useful output to move in a direction transverse to the current of working medium and be maintained in the magnetic field.

2. A process for the conversion of energy, which consists in producing a current of gaseous working medium containing particles having a positive charge and free electrons, producing a magnetic field which lies transverse to the direction of flow of said current, causing said gaseous current to flow through the said magnetic field, drawing out electrons from said current of working medium for the purpose of useful output from a point at lower positive potential in the working medium without passing through the magnetic field which assists in the generation of the useful voltage, leading back said electrons through an external circuit to the current of working medium at a point displaced in the direction of flow of such medium and at higher positive potential in such medium whilst maintaining in the magnetic field electrons which are not taken off for useful output and are caused to move in a direction transverse to the current of working medium in order to maintain their state of equilibrium.

3. Process as in claim 2, in which the working medium is in the form of vapour.

4. Process as in claim 2, in which gases containing particles of matter of a colloidal or suspensorial order of magnitude are used as a working medium.

5. Process as in claim 2, in which the working medium is conveyed through the magnetic field at a pressure of the order of one-tenth of an atmosphere.

6. Process as in claim 2, in which the working medium passes into the magnetic field at a high temperature.

7. Process as in claim 37, in which pre-dried air is used for the generation of the gases of combustion used as a working medium.

8. Process as in claim 37, in which fuels which furnish only a little water vapor, such as for example coke or semi-coke, are used for generating the gases of combustion.

9. A process for the conversion of energy which consists in producing a current of gaseous working medium, introducing electrons rays therein so as to produce positive ions and free electrons, producing a magnetic field which lies transverse to the direction of flow of said current, causing said gaseous current to flow through the magnetic field, drawing out electrons from said current of working medium for the purpose of useful output without passing through the magnetic field which assists in the generation of the useful voltage and leading back said electrons through an external circuit to the current of working medium at a point displaced in the direction of flow of such medium whilst maintaining in the magnetic field electrons which are not taken off for useful output and are caused to move in a direction transverse to the current of working medium in order to maintain their state of equilibrium.

10. A process for the conversion of energy which consists in producing a current of gaseous working medium, producing by means of an electric field positive ions and free electrons in said current, producing a magnetic field which lies transverse to the direction of flow of said current, causing said gaseous current to flow through said magnetic field, drawing out electrons from said current of working medium for the purpose of useful output without passing through the magnetic field which assists in the generation of the useful voltage and leading back said electrons through an external circuit to the current of working medium at a point displaced in the direction of flow of such medium whilst maintaining in the magnetic field electrons which are not taken off for useful output and are caused to move in a direction transverse to the current of working medium in order to maintain their state of equilibrium.

11. Process as in claim 2, in which the current of gaseous working medium is secured by expansion of the gas.

12. Process as in claim 1, characterised in that a supplementary ionization of the working medium takes place in the working chamber traversed by the magnetic flux.

13. Process as in claim 2, in which for the purpose of supplementary ionization electron rays are introduced preferably at an angle to the magnetic lines of force into the working chamber traversed by the magnetic flux.

14. Process as in claim 1, characterised in that the strength of the magnetic field along the working passage is varied according to the velocity of flow of the working medium.

15. Process as in claim 2, in which the strength of the magnetic field is varied accordingly as the load is varied.

16. Process as in claim 2, in which the pressure of the working medium is varied for the purpose of regulating the output of the generator.

17. Process as in claim 2, in which the voltage at the terminals of the generated electric current is regulated by varying the degree of ionization of the working medium.

18. Process as in claim 2, in which recourse is had to a variation of the velocity of the working medium for the purpose of influencing the degree of ionization of the working medium.

19. Apparatus for the conversion of energy comprising a working passage for carrying gaseous working medium, means for producing the flow of the working medium in the working passage, an ionising device, a device for generating magnetic flux across the passage, electrodes for taking off the electrons and leading them back into the interior of the working passage, said electrodes being displaced at positions displaced in the direction of the flow of working medium, and the walls of said working passage being so insulated as to allow of the formation of an electric field of force lying in the direction of flow of the gas.

20. Apparatus for the conversion of energy comprising a working passage for carrying gaseous working medium, means for producing the flow of the working medium in the working passage, an ionising device, a device for generating magnetic flux across the passage, electrodes for taking off the electrons and leading them back into the interior of the working passage, said electrodes being mounted at positions displaced in the direction of the flow of working medium, said electrode which carries the electrons away from the working passage being mounted relatively to the direction of flow of the gas in front of the magnetic field, and said electrode which leads the electrons back again into the working medium being mounted behind the magnetic field, and the walls of said working passage being so insulated as to allow of the formation of an electric field of force lying in the direction of flow of the gas.

21. Apparatus for the conversion of energy comprising a working passage for carrying gaseous working medium, means for producing the flow of the working medium in the working passage, an ionising device, a device for generating magnetic flux across the passage, electrodes for taking off electrons and leading them back into the interior of the working passage, said electrodes being mounted at positions displaced in the flow of working medium, a device which is connected with the working passage and which increases the energy content of the working medium, the walls of said working passage being so insulated as to allow of the formation of an electric field of force lying in the direction of flow of the gas.

22. Apparatus for the conversion of energy comprising a working passage for carrying gaseous working medium, means for producing the flow of the working medium in the working passage, an ionising device, a device for generating the magnetic flux across the passage, electrodes for taking off and leading the electrons back into the interior of the working passage, said electrodes being mounted at positions displaced in the direction of the flow of working medium, a combustion chamber which is connected with the working passage for the purpose of increasing the energy content of the working medium, and the walls of said working passage being so insulated as to allow of the formation of an electric field of force lying in the direction of flow of the gas.

23. Apparatus as in claim 19, in which the working passage has a metal wall divided by insulations.

24. Apparatus as in claim 19, in which the working passage has a metal wall divided by insulations and the part of the working passage lying in the neutral portion of the magnetic zones has wall components consisting of non-magnetisable medium.

25. Apparatus for the conversion of energy comprising a working passage for carrying gaseous working medium, means for producing a flow of the working medium in the working passage, an ionising device, a plurality of devices for generating magnetic flux across the passage, said devices being arranged along the passage and together generating non-coupled magnetic fluxes, electrodes for taking off and leading the electrons back into the interior of the working passage, said electrodes being mounted at positions displaced in the direction of the flow of working medium, and the walls of said working passage being so insulated as to allow of the formation of an electric field of force lying in the direction of flow of the gas.

26. Apparatus as in claim 25, in which the devices generating the individual magnetic fluxes are designed for the purpose of setting up magnetic fields having different strength of field.

27. Apparatus as in claim 25, in which the separate magnetic devices are designed for the purpose of generating different electric component voltages.

28. Apparatus as in claim 25, in which the magnetic fluxes enter the inner space in the working passage at pole surfaces differing in size from one another.

29. Apparatus for the conversion of energy comprising a working passage for carrying gaseous working medium, means for producing the flow of the working medium in the working passage, an ionising device, a device for generating the magnetic flux across the passage, electrodes for taking off and leading the electrons back into the interior of the working passage, said electrodes being mounted at positions displaced in the direction of the flow of working medium, the walls of said working passage being so insulated as to allow of the formation of an electric field of force lying in the direction of flow of the gas, a core mounted in said working passage and made of magnetisable metal, said core being subdivided by insulation and an insulated conductor connected with the member mounted on the core, for the purpose of deflecting or taking away the electrons from the working medium.

30. Apparatus as in claim 29, characterised in that the conductor for deflecting the electrons from the working medium is connected with a preferably cap-shaped member and is insulated from the core by means of an air-gap.

31. Apparatus as in claim 19, having a core which, mounted in the working passage, is made of magnetisable metal sections and is subdivided by insulations, holders for said core which are mounted in the working passages and yield to thermal expansion.

32. Apparatus as in claim 19, having a cooling device which is connected with the working passage and the purpose of which is to receive the working medium issuing from the working passage.

33. Apparatus as in claim 19, having a cooling device which is connected with the working passage and the purpose of which is to receive the working medium issuing from the working passage, said cooling device being electrically insulated from the working passage.

34. Apparatus as in claim 19, having a cooling device which is connected with the working passage and the purpose of which is to receive the working medium issuing from the working passage, and a compressor connected with said cooling device.

35. Apparatus according to claim 19, having a device, communicating with the inner space in the working passage through an opening, and adapted for generating the electron rays, and a magnetic device mounted near said device adapted to concentrate or direct the bundle of electron rays.

36. Apparatus as in claim 19, in which the wall of the combustion chamber is surrounded by a pressure-tight jacket the intermediate space being in communication with an air supply pipe as well as with an air delivering pipe connected with the combustion chamber.

37. The process of converting kinetic energy into electrical energy which comprises burning fuel to provide a stream of gases of combustion, ionizing said stream of gases of combustion to provide free electrons and positively charged particles, establishing and maintaining a magnetic field transverse to the direction of flow of said stream of gases, passing said stream of ionized gases through said magnetic field, said magnetic field deflecting the electrons into a direction transverse to the direction of flow of the gases to produce a concentration of electrons at the front of the magnetic field while the positively charged particles pass through the magnetic field, drawing out electrons from the front of the magnetic field, returning the drawn out electrons over an external electrical circuit to the stream of gases at a point behind the magnetic field.

38. The process of converting kinetic energy into electrical energy which comprises providing a stream of gases of combustion, providing a plurality of magnetic fields, passing said stream of gases transversely through said magnetic fields, subjecting said stream of gases to ionization prior to its entry into said magnetic fields to provide free electrons and positively charged particles, said magnetic fields acting on the free electrons to move them in a path transverse to the motion of the stream of gases to produce a concentration of electrons at the front of each of said magnetic fields while the positively charged particles pass through the magnetic field to produce an area at a high positive charge at the rear of the magnetic field, collecting electrons at the region of high concentration of electrons and returning the collected electrons over an external circuit to the region of high positive charge.

39. An electric generator comprising a combustion chamber, a substantially tubular throat for the passage of the gases of combustion, an expanding nozzle connected to said throat, a substantially conical working chamber connected with said nozzle, a core piece extending axially of said working chamber said core being composed of alternate sections of insulating and magnetizable material, electro-magnetic means for establishing a plurality of independent radial magnetic fields in said working chamber, means for ionizing the gases of combustion in front of each of said radial magnetic fields, an electron collecting electrode introduced into said working chamber in front of said radial magnetic field, an electron emitting electrode displaced from said electron collecting electrode and external electric circuit means connecting said electrodes.

40. An electric generator comprising a combustion chamber, a substantially tubular throat for the passage of the gases of combustion, an expanding nozzle connected to said throat, a substantially conical working chamber connected with said nozzle, a core piece extending axially of said working chamber said core being composed of alternate sections of insulating and magnetizable material, electro-magnetic means for establishing a plurality of independent radial magnetic fields in said working chamber, means for ionizing the gases of combustion in front of each of said radial magnetic fields, an electron collecting electrode introduced into said working chamber in front of said radial magnetic field, an electron emitting electrode displaced from said electron collecting electrode and external electric circuit means connecting said electrodes, and means for exhausting the gases of combustion from said working chamber.

41. An electric generator comprising a combustion chamber, a substantially conical work chamber connected to said combustion chamber by an expanding nozzle whereby the gases of combustion from said combustion chamber flow into said work chamber at high velocity, means for establishing a plurality of independent radial magnetic fields in said work chamber, means of ionizing the gases passing through said work chamber, an electron collecting electrode introduced into said work chamber, an electron emitting electrode introduced into said work chamber at a point displaced from said collecting electrode in the direction of flow of said gases and external electrical circuit means connecting said electrodes.

42. An electric generator comprising a combustion chamber, a work chamber of variable cross section communicating with said combustion chamber, the walls of said work chamber consisting of metallic sections separated by insulating material, electro-magnetic members surrounding said chamber for maintaining a transverse magnetic field in said work chamber, said magnetic members being spaced from the walls of said work chamber to electrically insulate said member from said chamber walls and to provide a passage between said wall and said members and means for circulating cooling media through said passage.

BÉLA KARLOVITZ.
DÉNES HALÁSZ.

McCreary, 1,964,738, Class 171-212 (320),

Rudenberg, 1,717,413, " " " "